(12) United States Patent
Hu

(10) Patent No.: US 8,296,589 B2
(45) Date of Patent: Oct. 23, 2012

(54) POWER SUPPLY CIRCUIT FOR CPU

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 356 days.

(21) Appl. No.: 12/728,566

(22) Filed: Mar. 22, 2010

(65) Prior Publication Data

US 2011/0099309 A1   Apr. 28, 2011

(30) Foreign Application Priority Data

Oct. 23, 2009   (CN) .................. 2009 2 0313171 U

(51) Int. Cl.
*G06F 1/00* (2006.01)
*G06F 1/26* (2006.01)

(52) U.S. Cl. .................. 713/300; 713/320; 713/322

(58) Field of Classification Search .................. 713/300, 713/320, 322
See application file for complete search history.

(56) References Cited

U.S. PATENT DOCUMENTS

| | | | | |
|---|---|---|---|---|
| 5,581,712 | A * | 12/1996 | Herrman ........................ | 710/302 |
| 6,907,535 | B2 * | 6/2005 | Fang ............................. | 713/322 |
| 7,948,422 | B2 * | 5/2011 | Chiu ............................. | 341/155 |
| 2001/0005893 | A1 * | 6/2001 | Shen et al. ..................... | 713/300 |
| 2002/0194516 | A1 * | 12/2002 | Muratov et al. ................ | 713/320 |
| 2004/0210779 | A1 * | 10/2004 | Wang ............................ | 713/300 |
| 2010/0033151 | A1 * | 2/2010 | Wu et al. ...................... | 323/285 |
| 2010/0169701 | A1 * | 7/2010 | Tu ................................. | 713/600 |

* cited by examiner

*Primary Examiner* — Vincent Tran
(74) *Attorney, Agent, or Firm* — Altis Law Group, Inc.

(57) ABSTRACT

A power supply circuit includes a PWM controller capable of providing pulse signals to a CPU, and an I/O controller electrically coupled to the PWM controller and the CPU respectively. The I/O controller is capable of receiving voltage selection signals from the CPU and outputting a control signal to the PWM controller. The PWM controller is capable of adjusting pulse signals provided to the CPU according to the control signal.

13 Claims, 3 Drawing Sheets

POWER SUPPLY CIRCUIT FOR CPU

BACKGROUND

1. Technical Field

The present disclosure relates to power supply, and particularly to a power supply circuit for a CPU (central processing unit).

2. Description of Related Art

With the rapid development of personal computers, development of high performance components for computers has brought about a corresponding increase in power use. A CPU has a crucial effect on the stability of a computer. A power supply circuit is specially designed for providing power to the CPU.

Referring to FIG. 1, a commonly used power supply circuit for a CPU includes a PWM (pulse-width modulation) controller 50 which provides three pulse signals of, for example, phase 1, phase 2, and phase 3. Each of the three pulse signals turns a corresponding switch on or off at different times to provide multiphase power to the CPU. The PWM controller 50 is controlled by an I/O controller 40 also electrically coupled to a Southbridge chip 60. The Southbridge chip 60 provides a 3.3V DC voltage for the I/O controller 40 when the computer is powered off. However, the Southbridge chip 60 is grounded via the CPU and discharges to ground, which generates large amounts of leakage currents on the CPU whereby the computer cannot function.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
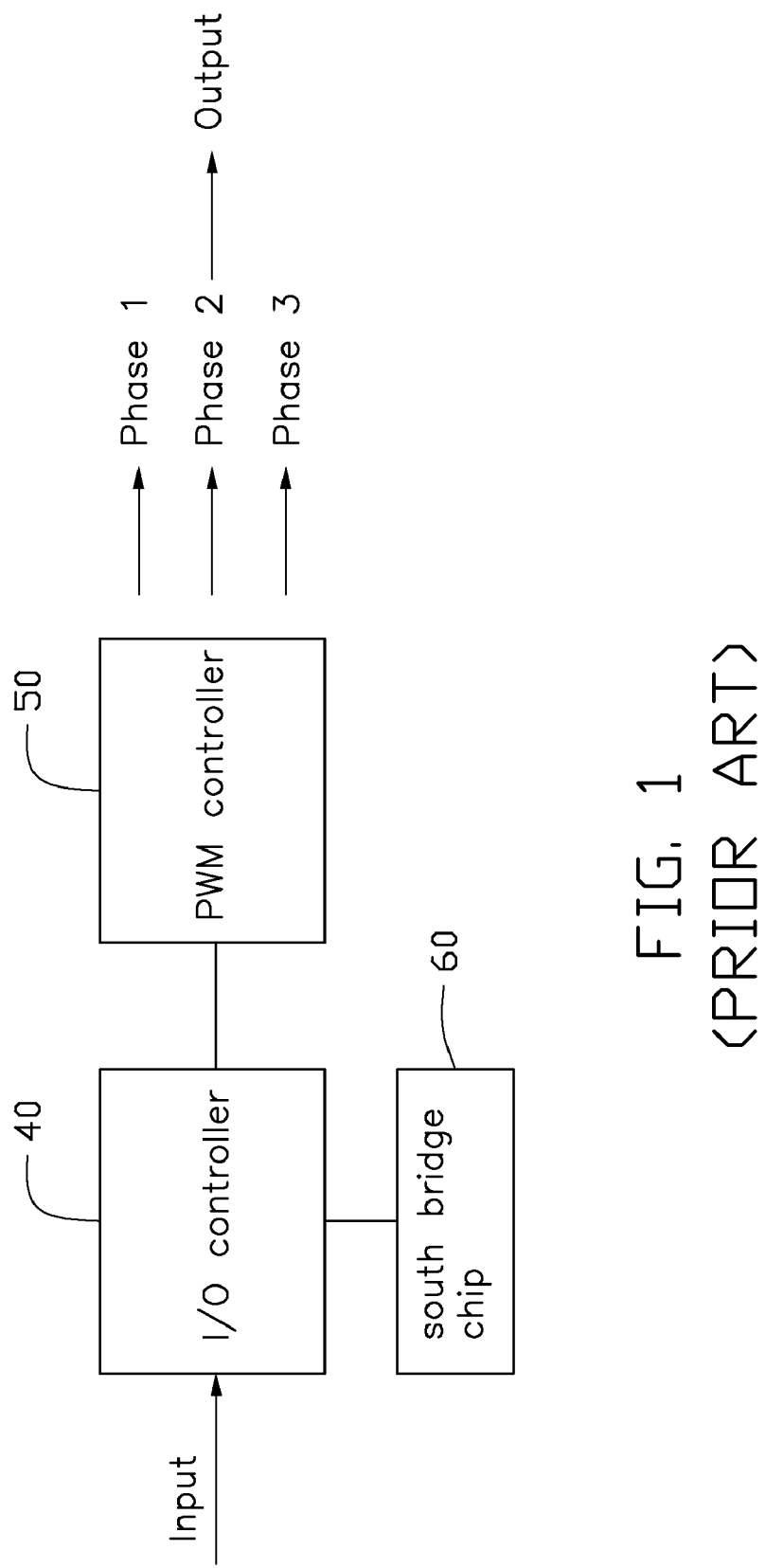
FIG. 1 is a block view of a commonly used power supply circuit for a CPU, according to the prior art.
Figure 2:
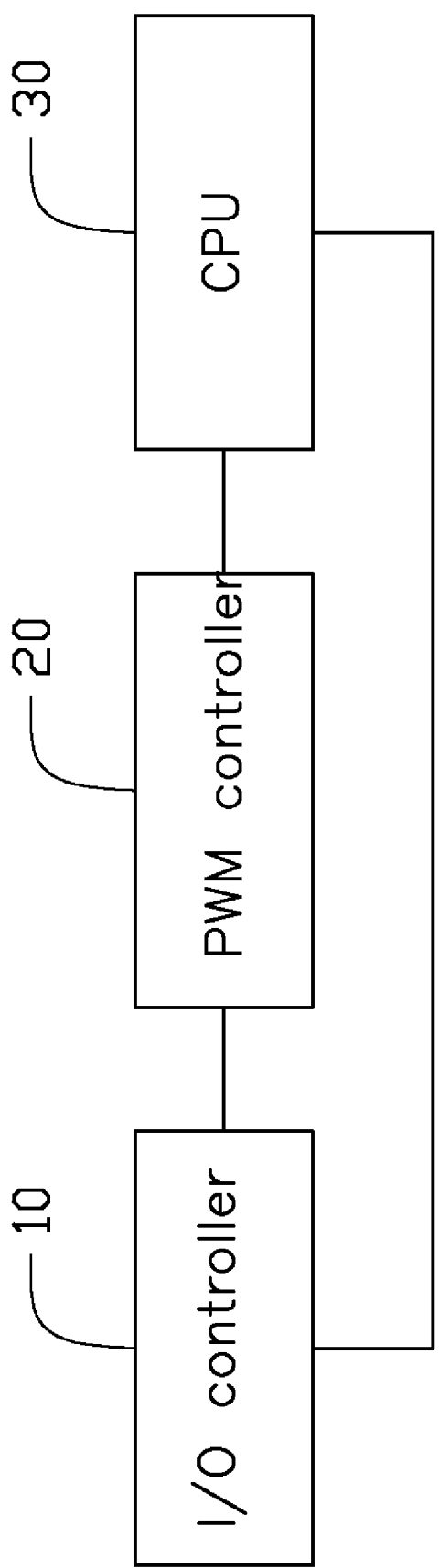
FIG. 2 is a block view of an embodiment of a power supply circuit for a CPU as disclosed.

Referring to FIG. 2, an embodiment of a power supply circuit for a CPU 30 includes an I/O controller 10 and a PWM controller 20. The I/O controller 10 is electrically coupled to the CPU 30 via the PWM controller 20. The I/O controller 10 is configured for receiving voltage selection signals from the CPU 30, and outputting a control signal to the PWM controller 20. The PWM controller 20 is configured for adjusting pulse signals provided to the CPU 30 according to the control signal.

Figure 3:
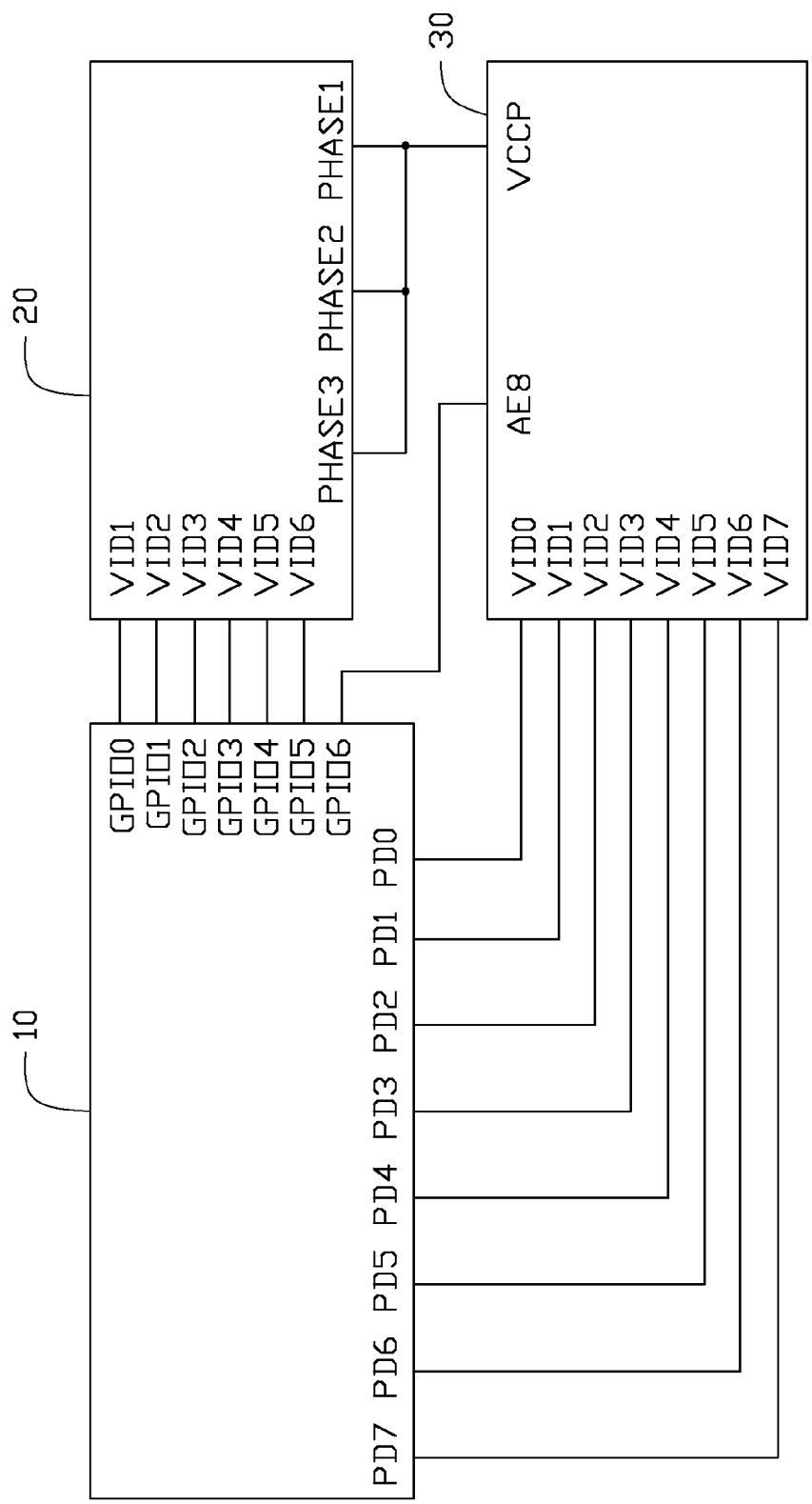
FIG. 3 is a circuit view of the power supply circuit of FIG. 2.

Referring to FIG. 3, the I/O controller 10 includes a plurality of input and output terminals, such as input terminals PD0~PD7 for receiving voltage selection signals from the CPU 30; control output terminals GPIO0~GPIO5; and detecting output terminal GPIO6, for outputting detection signals to determine whether the CPU 30 is installed in the circuit. In one embodiment, the PWM controller 20 is an ISL6312 series control chip manufactured by Intelsil. The PWM controller 20 includes a plurality of input and output terminals, such as input terminals VID1~VID6 and output terminals PHASE1, PHASE2, PHASE3, for providing multiple pulse signals to the CPU 30. The PWM controller 20 input terminals VID1~VID6 are electrically coupled to the I/O controller 10 control output terminals GPIO0~GPIO5 respectively. The CPU 30 includes a plurality of input and output terminals, such as input terminal VCCP, status determination terminal AE8, and output terminals VID0~VID7 for outputting voltage selection signals. The CPU 30 output terminals VID0~VID7 are electrically coupled to the I/O controller 10 input terminals PD0~PD7 respectively.

In operation, the I/O controller 10 receives the voltage selection signals from the CPU 30, and outputs a control signal to the PWM controller 20. The I/O controller 10 is no longer electrically coupled to the Southbridge chip 60 as in the typical power supply circuit. The Southbridge chip 60 cannot discharge via the CPU 30. The power supply circuit provides power to the CPU 30 smoothly and steadily. The I/O controller 10 outputs detection signals to the CPU 30, and if the CPU 30 outputs a low level feedback signal to the I/O controller 10, upon receiving the detection signals, the I/O controller 10 determines that the CPU 30 is installed in the circuit; if the CPU 30 outputs a high level feedback signal to the I/O controller 10, upon receiving the detection signals, the I/O controller 10 determines that the CPU 30 is not installed in the circuit.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit, comprising:
 a PWM controller capable of providing pulse signals to a CPU; and
 an I/O controller electrically coupled to the PWM controller and the CPU respectively, wherein the I/O controller is capable of receiving voltage selection signals from the CPU and outputting a control signal to the PWM controller; and the PWM controller is capable of adjusting pulse signals provided to the CPU according to the control signal; wherein the I/O controller comprises a detecting output terminal capable of outputting detection signals that determine whether the CPU is installed in the circuit, the CPU comprises a status determination terminal electrically coupled to the detecting output terminal for receiving the detection signals; the CPU is capable of outputting a feedback signal to the I/O controller at the status determination terminal upon receiving the detection signals; and the I/O controller is capable of determining whether the CPU is installed in the circuit according to the feedback signal.

2. The power supply circuit of claim 1, wherein the CPU comprises a plurality of output terminals for outputting voltage selection signals, and the I/O controller comprises a plurality of input terminals electrically coupled to the CPU output terminals for receiving the voltage selection signals.

3. The power supply circuit of claim 2, wherein the I/O controller further comprises a plurality of control output terminals for outputting control signals, and the PWM controller comprises a plurality of input terminals electrically coupled to the I/O controller control output terminals for receiving the control signals.

4. The power supply circuit of claim 3, wherein the PWM controller further comprises a plurality of output terminals for outputting pulse signals, and the CPU further comprises an input terminal electrically coupled to the PWM controller output terminals.

5. The power supply circuit of claim 1, wherein if the status determination terminal outputs a low level feedback signal to the I/O controller upon receiving the detection signals, the I/O controller is capable of determining that the CPU is installed in the circuit.

6. The power supply circuit of claim 1, wherein if the status determination terminal outputs a high level feedback signal to the I/O controller upon receiving the detection signals, the I/O controller is capable of determining that the CPU is not installed in the circuit.

7. A power supply circuit, comprising:
a PWM controller capable of providing pulse signals to a CPU; and
an I/O controller electrically coupled to the PWM controller and the CPU respectively, wherein the I/O controller is capable of receiving voltage selection signals from the CPU and outputting a control signal to the PWM controller; and the PWM controller is capable of adjusting pulse signals provided to the CPU according to the control signal; wherein the I/O controller is capable of outputting detection signals that determine whether the CPU is installed in the circuit, the CPU is capable of receiving the detection signals, and outputting a feedback signal to the I/O controller upon receiving the detection signals; and the I/O controller is capable of determining whether the CPU is installed in the circuit according to the feedback signal.

8. The power supply circuit of claim 7, wherein if the CPU outputs a low level feedback signal to the I/O controller upon receiving the detection signals, the I/O controller is capable of determining that the CPU is installed in the circuit.

9. The power supply circuit of claim 7, wherein if the CPU outputs a high level feedback signal to the I/O controller upon receiving the detection signals, the I/O controller is capable of determining that the CPU is not installed in the circuit.

10. The power supply circuit of claim 7, wherein the I/O controller comprises a detecting output terminal for outputting the detection signals and receiving the feedback signal; and the CPU comprises a status determination terminal electrically coupled to the detecting output terminal for receiving the detection signals and outputting the feedback signal.

11. The power supply circuit of claim 7, wherein the CPU comprises a plurality of output terminals for outputting voltage selection signals, and the I/O controller comprises a plurality of input terminals electrically coupled to the CPU output terminals for receiving the voltage selection signals.

12. The power supply circuit of claim 11, wherein the I/O controller further comprises a plurality of control output terminals for outputting control signals, and the PWM controller comprises a plurality of input terminals electrically coupled to the I/O controller control output terminals for receiving the control signals.

13. The power supply circuit of claim 12, wherein the PWM controller further comprises a plurality of output terminals for outputting pulse signals, and the CPU further comprises an input terminal electrically coupled to the PWM controller output terminals.

* * * * *